United States Patent
Ramabhadran et al.

(10) Patent No.: US 11,308,039 B2
(45) Date of Patent: Apr. 19, 2022

(54) BINDING LOCAL DEVICE FOLDERS TO A CONTENT MANAGEMENT SYSTEM FOR SYNCHRONIZATION

(71) Applicant: Dropbox, inc., San Francisco, CA (US)

(72) Inventors: Pranav Vishnu Ramabhadran, San Francisco, CA (US); Maxime Larabie-Belanger, San Francisco, CA (US); Nipunn Koorapati, San Francisco, CA (US); Adam Arbree, Fairfax, CA (US); Rishabh Jain, San Francisco, CA (US); Haynes George, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 119 days.

(21) Appl. No.: 16/731,355

(22) Filed: Dec. 31, 2019

(65) Prior Publication Data
US 2021/0200720 A1    Jul. 1, 2021

(51) Int. Cl.
| | |
|---|---|
| *G06F 3/0482* | (2013.01) |
| *G06F 16/178* | (2019.01) |
| *H04L 67/1095* | (2022.01) |
| *H04L 67/306* | (2022.01) |

(52) U.S. Cl.
CPC .......... *G06F 16/178* (2019.01); *G06F 3/0482* (2013.01); *H04L 67/1095* (2013.01); *H04L 67/306* (2013.01)

(58) Field of Classification Search
CPC . H04L 67/306; H04L 67/1095; G06F 3/0482; G06F 16/178
See application file for complete search history.

(56) References Cited

U.S. PATENT DOCUMENTS

| | | |
|---|---|---|
| 7,991,734 B2 | 8/2011 | Park et al. |
| 9,282,169 B1 * | 3/2016 | Chang .................. G06F 16/275 |
| 9,413,824 B1 | 8/2016 | Newhouse |

(Continued)

FOREIGN PATENT DOCUMENTS

| | | |
|---|---|---|
| GB | 2399663 A | 9/2004 |
| WO | 2016115009 A1 | 7/2016 |

OTHER PUBLICATIONS

Gaylord K., "Keep Local and Network Files in Synch with W2K's Offline Files," Windows Professional, vol. 7, No. 10, Oct. 2002, pp. 1-6.

(Continued)

*Primary Examiner* — Rashawn N Tillery
(74) *Attorney, Agent, or Firm* — Polsinelli PC

(57) ABSTRACT

The present technology can move operating system folders into a sync folder of a cross platform content management system, and redirect the operating system to look for the OS folders in the sync folder. The present technology also provides an invariant checker to make sure that another application has not moved the OS folders after they have been placed in the sync folder, and provides solutions when the OS folders are moved out of the sync folder of the content management system. Additionally, when OS folders for multiple client devices are in the sync folder on the content management system, the present technology can provide a mechanism to make the content items in an OS folder on a first client device also sync into an OS folder on second client device.

20 Claims, 7 Drawing Sheets

(56) References Cited

U.S. PATENT DOCUMENTS

| | | | | |
|---|---|---|---|---|
| 9,633,125 | B1* | 4/2017 | Garcia | G06F 3/0482 |
| 9,749,408 | B2 | 8/2017 | Subramani et al. | |
| 9,866,508 | B2 | 1/2018 | Daher et al. | |
| 9,929,990 | B2 | 3/2018 | Subramani et al. | |
| 10,061,779 | B2 | 8/2018 | Brand | |
| 10,264,072 | B2 | 4/2019 | Crofton et al. | |
| 2009/0112915 | A1* | 4/2009 | Lele | G06F 16/20 |
| 2009/0228524 | A1* | 9/2009 | Park | G06F 16/00 |
| 2011/0137947 | A1* | 6/2011 | Dawson | G06F 21/6209 |
| | | | | 707/785 |
| 2014/0304618 | A1* | 10/2014 | Carriero | H04L 51/08 |
| | | | | 715/753 |
| 2014/0337278 | A1* | 11/2014 | Barton | G06F 16/1873 |
| | | | | 707/608 |
| 2015/0142742 | A1 | 5/2015 | Hong | |
| 2016/0283085 | A1 | 9/2016 | Beausoleil et al. | |
| 2018/0103096 | A1* | 4/2018 | Micucci | H04L 67/26 |
| 2018/0189692 | A1 | 7/2018 | Newhouse et al. | |
| 2018/0336196 | A1* | 11/2018 | Garg | G06F 16/10 |
| 2019/0205423 | A1 | 7/2019 | Haven et al. | |

OTHER PUBLICATIONS

Munn E., "Sync Any Folder Across All Your Devices," Workshop 2, Web User, Oct. 18-31, 2017, pp. 54-55.
International Search Report and Written Opinion for PCT Application No. PCT/US2020/043737 dated Dec. 22, 2020, 12 pages.
Invitation to Pay Fees and Partial International Search Report for PCT Application No. PCT/US2020/043737, dated Oct. 28, 2020, 7 pages.
Spanfellar J. et al., "Sync Files and Folders Outside Your My Dropbox Folder," XP055737983, retrieved from https://lifehacker.com/sync-files-and-folders-outside-your-my-dropbox-folder-5154698, Sep. 29, 2009, 5 pages.

* cited by examiner

BINDING LOCAL DEVICE FOLDERS TO A CONTENT MANAGEMENT SYSTEM FOR SYNCHRONIZATION

TECHNICAL FIELD

The present technology pertains to synchronization of local device folders, and more particularly pertains to migrating local device folders to a sync directory under the control of a content management system for synchronization.

BACKGROUND

Users have come to appreciate and rely on content management systems, especially cross platform content management systems (not specific to any operating system) that can make their files accessible via native file system browsers on any device. Such services typically monitor a sync folder on each device having a content management system client running on it and can synchronize content in the sync folder to the cloud and to other client devices having their own sync folder and content management system client. While this service is useful and easy to use, it requires users to make sure to put content items that they wish to have synchronized to the cloud and across client devices into the sync folder. Meanwhile, the operating systems on client devices and applications meant to run on those operating systems are designed to make it most convenient to store and access content items in operating system (OS) folders such as a "desktop" folder, a "documents" or "my documents" folder, a "photos" or "music" folder, etc. Since these folders are outside of the sync folder, the contents of these folders are not synchronized by the content management system.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a technology that can synchronize operating system folders in cross platform systems. Users have come to appreciate and rely on content management systems, especially cross platform content management systems (not specific to any operating system) that can make their files accessible via native file system browsers on any device. Such services typically monitor a sync folder on each device having a content management system client running on it and can synchronize content in the sync folder to the cloud and to other client devices having their own sync folder and content management system client. While this service is useful and easy to use, it does require users to make sure to put content items that they wish to have synchronized to the cloud and across client devices into the sync folder. Meanwhile, the operating systems on client devices and applications meant to run on those operating systems are designed to make it most convenient to store and access content items in operating system (OS) folders such as a "desktop" folder, a "documents" or "my documents" folder, a "photos" or "music" folder, etc. Since these folders are outside of the sync folder, the contents of these folders are not synchronized by the content management system.

The present technology addresses this need in the art by moving operating system folders into a sync folder of a cross platform content management system sync folder, and by redirecting the operating system to look for the OS folders in the sync folder. However, moving the OS folders into the sync folder causes several other possible technical problems, and creates other opportunities, and the present technology addresses these as well. For example, just as the content management system can move the OS folders, so too can other applications. The present technology provides an invariant checker to make sure that another application has not moved the OS folders after they have been placed in the sync folder, and provides solutions when the OS folders are moved out of the sync folder of the content management system. Additionally, when OS folders for multiple client devices are in the sync folder on the content management system, the present technology can provide a mechanism to make the content items in an OS folder on a first client device also sync into an OS folder on second client device.

Figure 1:
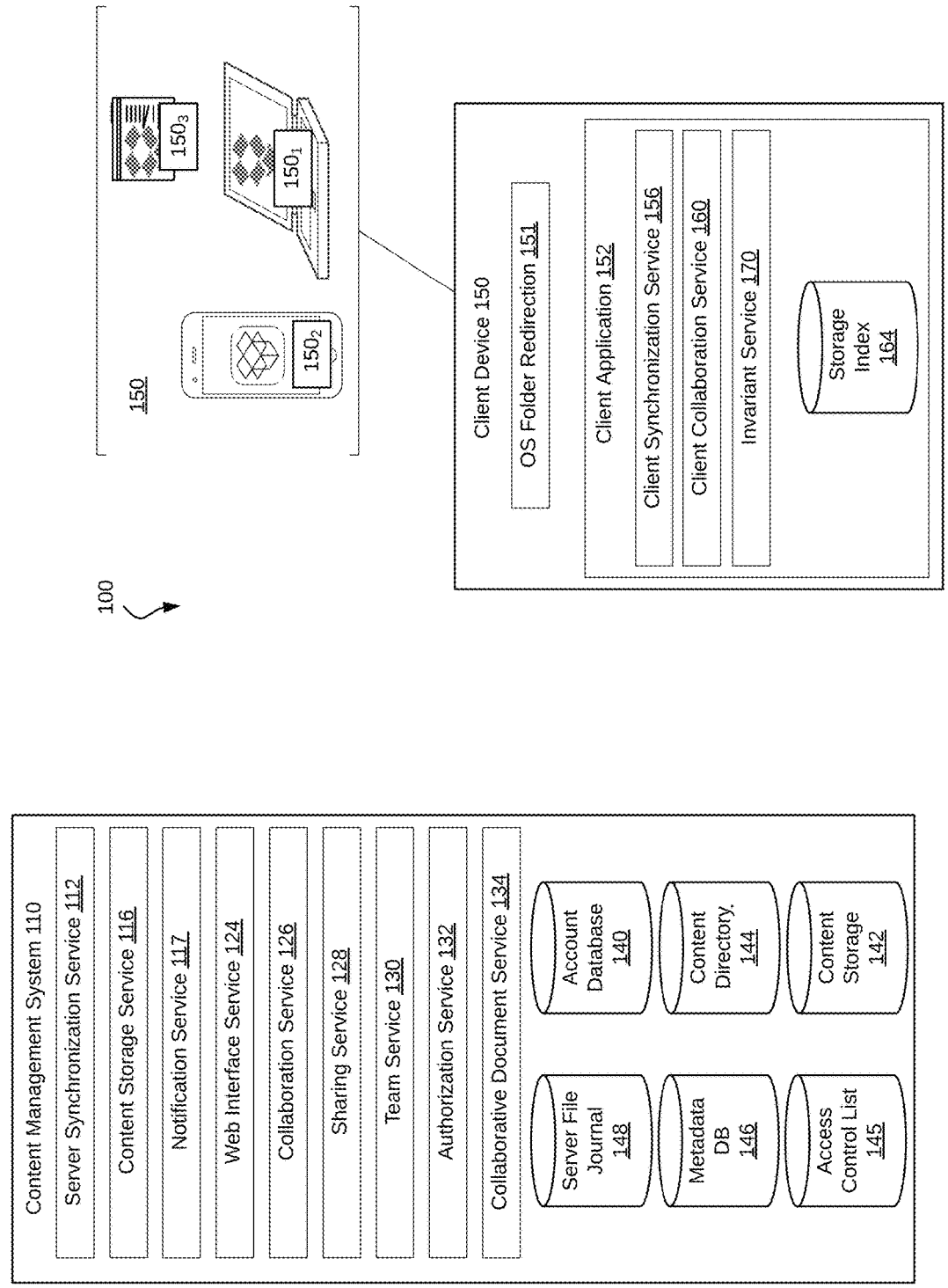
FIG. 1 shows an example of a content management system and client devices in accordance with some aspects of the present technology.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

Local Device Folder Redirection

In some embodiments, client application 152 can be used to synchronize local device folders including OS folders or other folders stored in a location outside of a sync folder managed by client application 152 by interfacing with an operating system of client device 150. Different operating systems have different OS folder redirection mechanisms 151 for redirecting references to folders. For example, the operating system WINDOWS by MICROSOFT includes a known folder manager API that can be used to redirect where the WINDOWS operating system looks for its local device folders, including OS folders such as its "desktop," "documents," "downloads," "photos," and "music" folders. In the operating system MACOS by APPLE, a function known as symbolic links or symlinks can be used to redirect where MACOS looks for its local device folders, including its OS folders such as its "desktop," "documents," "downloads," "photos," and "music" folders.

Client application 152 can use an OS folder redirection mechanism 151 for the operating system running on client device 150 to redirect local device folders into a sync location managed by client application 152. Once the local device folders are in the sync location managed by client application 152, the content items in these local device folders can be synchronized with content management system 110.

Client application 152 also includes an invariant service 170. Just as client application 152 is able to utilize OS folder redirection mechanism 151 to redirect the location of local device folders, other applications can do the same. Accordingly, client application 152 includes invariant service 170 that can be used to determine whether OS folder redirection mechanism 151 continues to point to the sync folder of client application 152, or does OS folder redirection mechanism 151 point to a different location for the local device folders. Since OS folders are required folders, without which operating system and applications made for that operating system cannot function, invariant service 170 can be configured to prioritize operating system integrity over other objectives.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
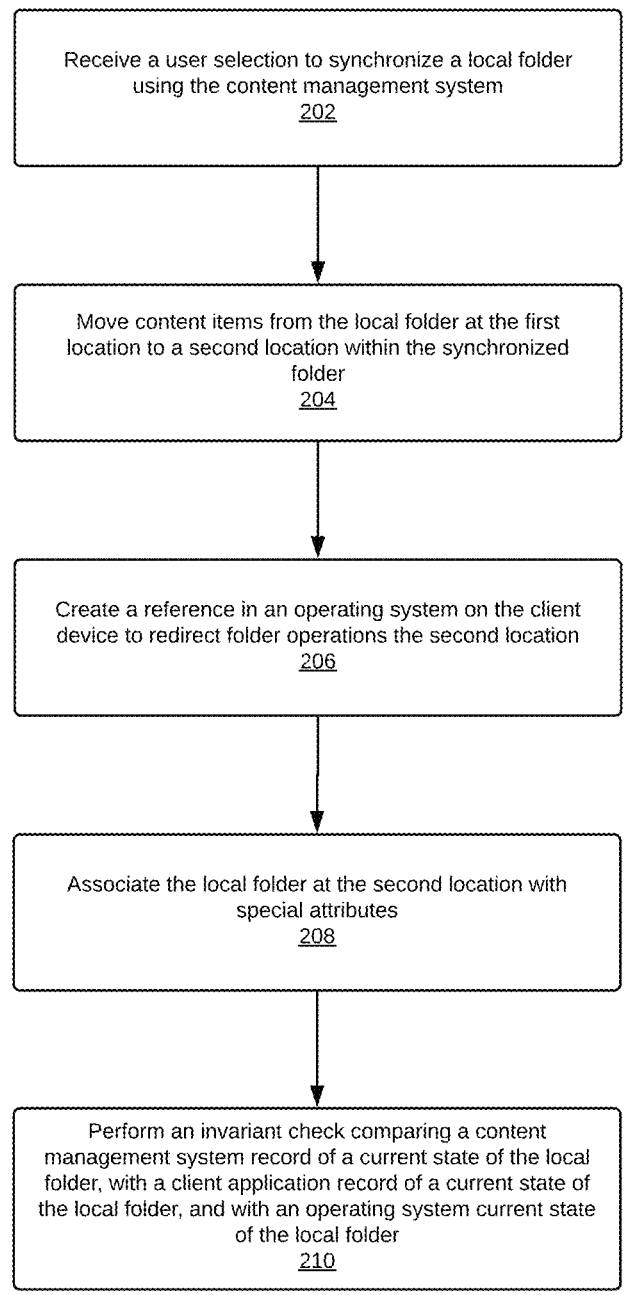
FIG. 2 shows an example method for migrating local device folders to a sync directory under the control of a content management system for synchronization in accordance with some aspects of the present technology.

FIG. 2 illustrates an example method for redirecting a local device folder from its original location (a first location) to a location within the sync folder (a second location) of client application 152.

Figure 3:
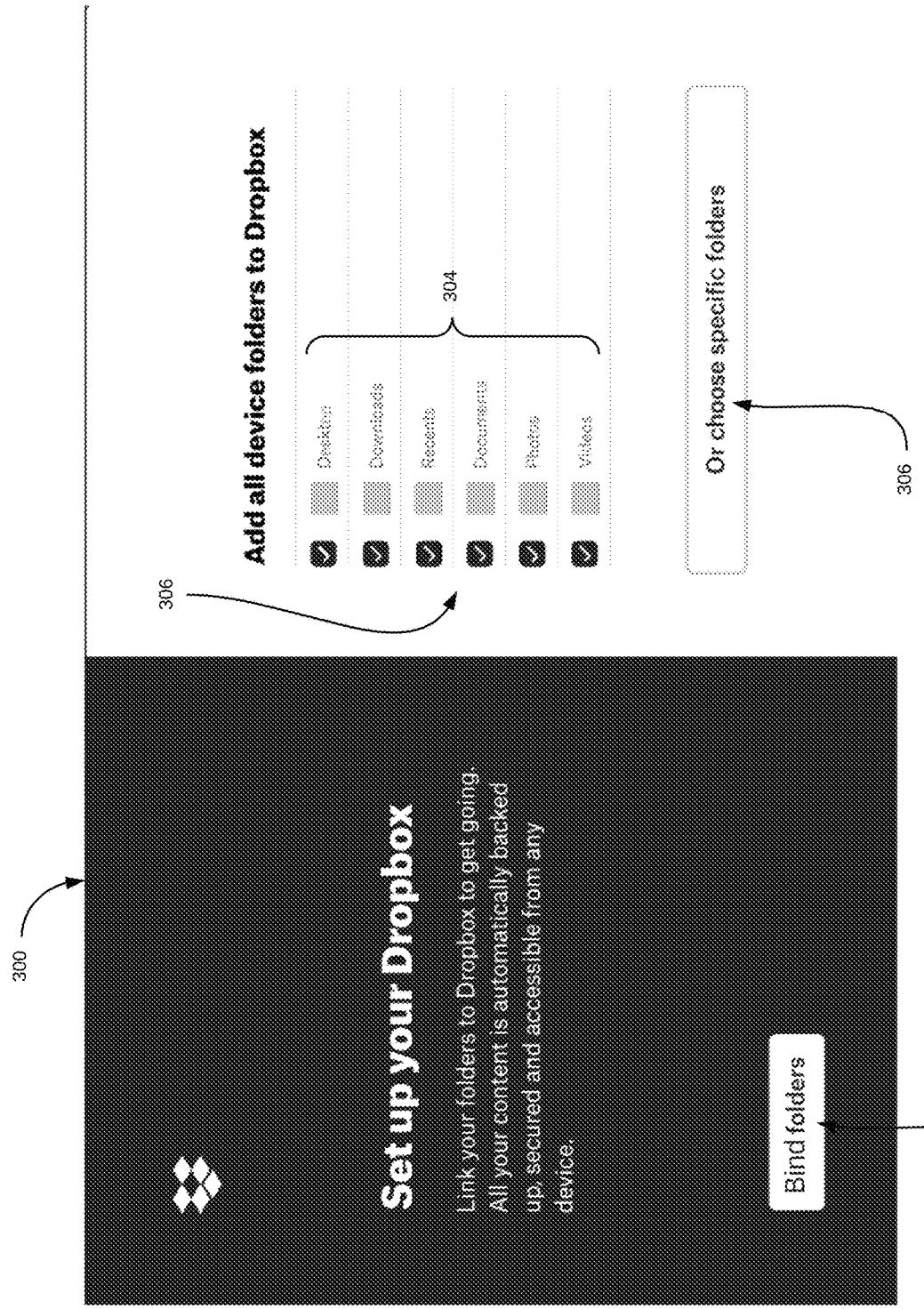
FIG. 3 shows an example user interface for initiating migration of local device folders to a sync directory under the control of a content management system for synchronization in accordance with some aspects of the present technology.

FIG. 2 begins when client application 152 receives (202) a user selection to synchronize a local device folder using content management system 110. FIG. 3 illustrates user interface 300 for receiving (202) the user selection to synchronize local device folders. For example, user interface 300 includes a selectable option 302 requesting to bind local device folders to the content management system (DROPBOX). User interface 300 also shows OS folders 304 and provides options 306 to select specific local device folders to bind to the content management system.

After client application 152 receives (202) the user selection to synchronize the local device folders with the content management system, client application 152 can first create a new folder representing a specific device, and then client application 152 can move (204) content items from the local device folder from its default location (first location) to a second location within the synchronize folder. The second location being a location in the sync directory in a path that is subordinate to the sync directory root, and subordinate to a folder representing the specific client device from which the local device folder originated. By putting the second location of the local device folder under a folder for the specific client device from which it originated, this ensures that the content remains identifiable as originating from the specific client device, and ensures no directory conflicts from folders on two different devices with the same name.

Client application 152 can also utilize a folder redirection mechanism 151 provided by the operating system to provide (206) a reference in the operating system to redirect folder operations for the local device folder to find the local device folder at the second location. In some embodiments, folder redirection mechanism 151 can replace a reference to the local device folder at the first location with a reference to the local device folder at the second location.

Figure 4:
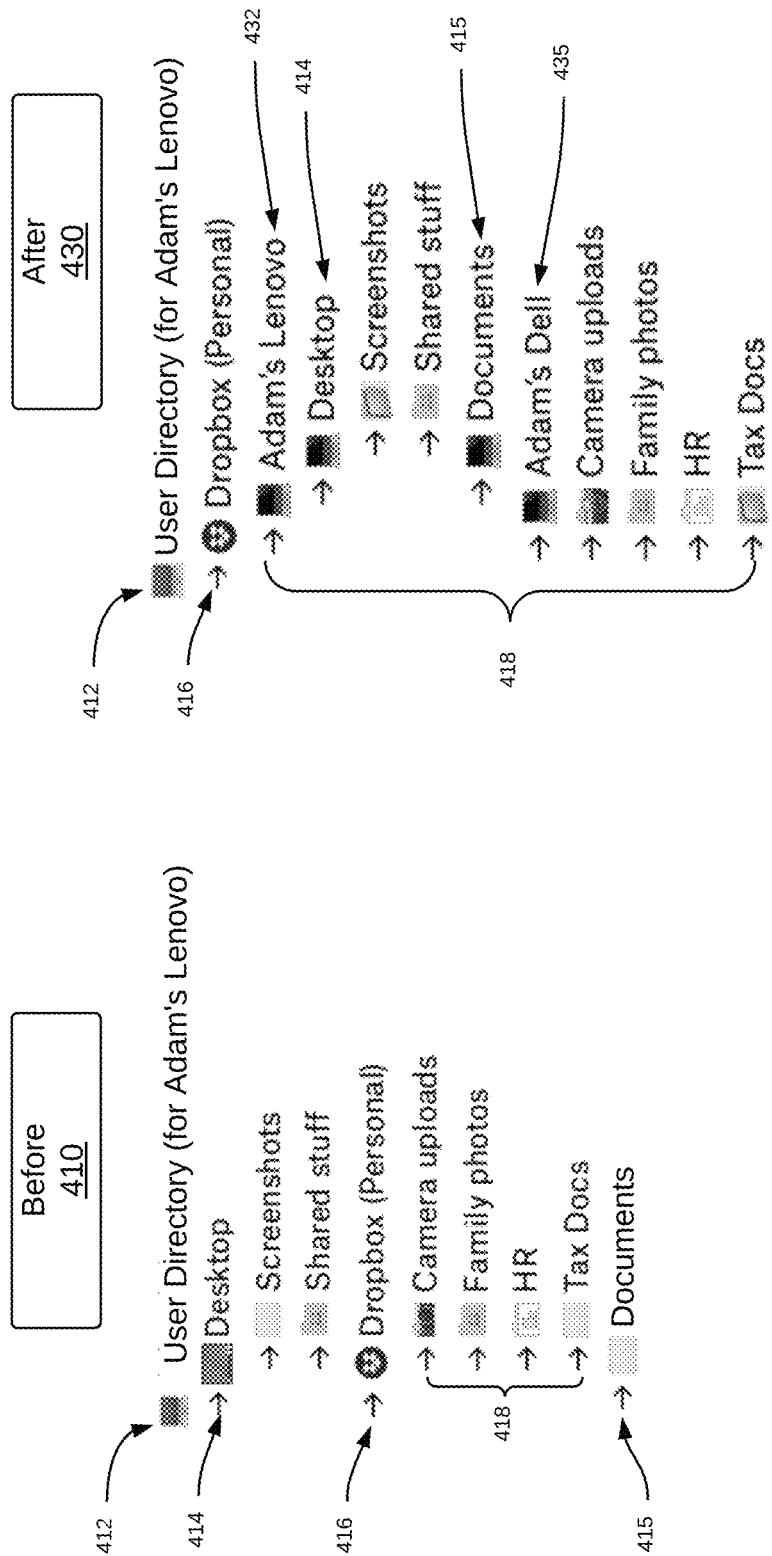
FIG. 4 shows an example of a directory on a client device before and after migration of local device folders to a sync directory under the control of a content management system for synchronization in accordance with some aspects of the present technology.

FIG. 4 illustrates an example directory structure before and after local device folders have been moved (204) from their first location to a second location within the sync folder.

On the left, FIG. 4 shows an example client device directory before 410 local device folders have been moved (204). At the top of the example before 410 directory is the user directory 412 on the user's Lenovo computer. At the next level of the directory are local device folders 414 "desktop" and 415 "documents" and sync directory 416 "Dropbox". Within the sync directory 416 there are synchronized directories 418.

On the right, FIG. 4 shows an example directory structure 430 after local device folders have been moved (204). In the after 430 directory structure the user directory 412 remains at the top of the directory, but a new folder 432 for Adam's Lenovo has been created in sync directory 416. Folder 432 is named Adam's Lenovo such that it is apparent to a user that all of the content synced under this folder originated from Adam's Lenovo computer. Under folder 432 are local device folders 414 and 415 "desktop" and "documents," respectively. Collectively folder 432, folder 414, and folder 415 all join synchronized directories 418 as they are all now under the management of content management system 110.

FIG. 4 also illustrates the presence of another folder in the after 430 state. FIG. 4 illustrates a folder for another of the user's computers, "Adams Dell" 435. Any folders in the directory path of folder 435 are folders with content items that come from the computer "Adam's Dell" instead of the computer "Adam's Lenovo."

Returning to FIG. 2, after the local device folders have been moved (204), client application 152 can associate (208) the local device folder at the second location with special attributes. These special attributes can be defined in metadata and can flag the folder as a local device folder. Client application 152 and content management system 110 will recognize any folder flagged as a local device folder is a folder that cannot be deleted. Additionally, any local device folder that is an OS folder can be associated with the same iconography used by the operating system of client device 150. For example, a desktop folder of a WINDOWS operating system can have a special icon before the desktop folder is moved and that icon can be maintained after the desktop folder is moved to the second location. The icon to be displayed can be defined by the special attributes. As such the special attributes can define customized display behavior.

Content items in local device folders can also be associated with special attributes. For example, a special attribute can identify a particular content item to be excluded from synchronization. Another special attribute can identify a particular content item to be synchronized only with content management system 110 and not with other client devices. Such controls are important because some content items are not valid after they have been moved. For example, an index on a particular device might be seen as a corrupt index if it was moved to another device. Therefore, such an index should be allowed to be synchronized between the device that created the index and content management system 110 but should not be synchronized any other client device. As such the special attributes can define customized synchronization behavior that can be different for each client device or for the server.

Once the local device folder has been moved to the second location, the local device folder can be synchronized with the content management system. Each of the content management system 110, the client application 152, and the operating system can all record the directory path to the local device folder. When all of content management system 110, client application 152, and operating system all reflect the same directory path to the local device folder, the system is in a proper state. However, when any of the sources of information reflect a different directory path, then an error has potentially occurred. Since OS folders are required by the operating system, whenever an error occurs client application 152 must preserve or restore integrity of any OS folder.

As such client application 152 can repeatedly perform an invariant check (210) comparing a content management system record of the current state of the local device folder with a client application record of a current state of the local device folder with an operating system current state of the local device folder.

Figure 5:
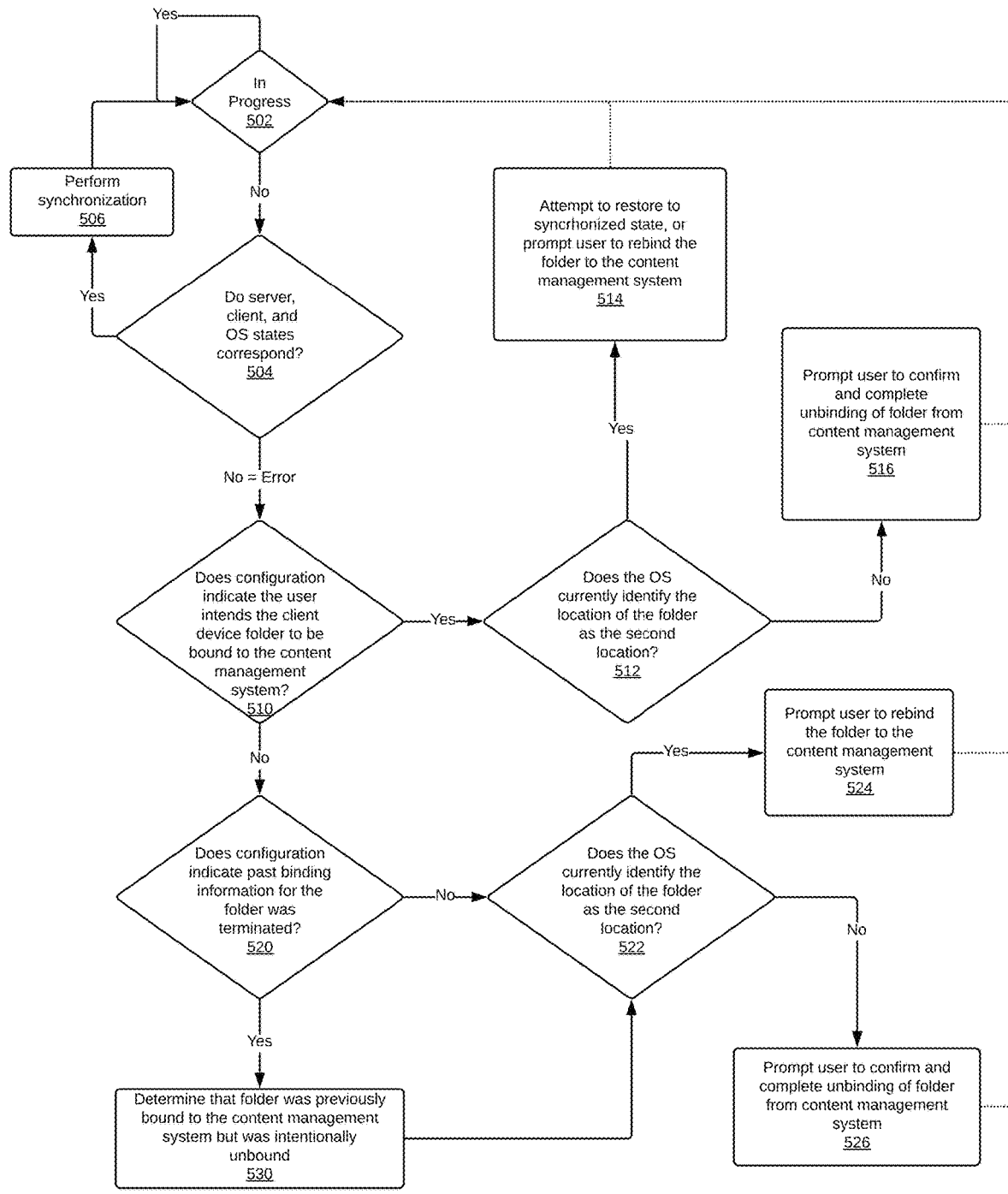
FIG. 5 shows an example method for ensuring invariance between a client device state, a client application state, and a server state in accordance with some aspects of the present technology.

FIG. 5 illustrates an example of an invariant check (210). The invariant check can be performed periodically or at least before any synchronization operation on the local device folders is to occur by invariant checker 170. The invariant check begins by determining (502) whether any active operation is in progress on one of the local device folders. If an active operation is in progress, then the invariant check pauses and tries again.

Assuming there was no active operation (502) occurring on any of the local device folders, the invariant checker 170 can compare (504) the content management system record of the current state of the local device folder with the client application record of the current state of the local device folder with the operating system state for the location of the mobile device folder. Assuming all three states match, then it can be determined that there is no variation between where the content management system the client application and operating system all expect the local device folder to be and client synchronization service 156 can synchronize (506) the local device folder with content management system 110.

However, if any of the three states do not match, then it can be determined that at least one of the states is in error. Invariant checker 170 can then continue to determine whether (510) the user's intention is to have the local device folder be under management of the content management system or that the user's intention is to have the local device folder be located outside (530) the content management system, or determine (520) that the invariant checker 170 does not know the user's likely intent.

Invariant checker 170 can first determine whether (510) a configuration indicates that the client device folder was previously bound to the content management system. This can be determined when client application 152 has records indicating that the user chose to migrate the local device folder into the sync folder. When it is determined (510) that the client device folder was previously bound to the content management system, invariant checker 170 can then determine (512) whether the operating system currently identifies the location of the client device folder as being at the second location (i.e., In the sync folder). When it is determined at the operating system currently identifies the sync folder is the proper location of the client device folders, it can be concluded that the user intends to have client device folders under the management of content management system 110, and the invariant checker 170 can attempt to restore to a synchronized state (514). If the invariant checker cannot restore to a synchronized state, the invariant checker can prompt (514) the user to rebind the folder to the content management system.

If, however, it is determined (512) that the operating system does not currently identify the sync folder as the location of the client device folder, client application 152 can prompt (516) the user to confirm that the unbinding of the client device folders from the content management system is intentional, and based on the response can take appropriate action.

In some embodiments, the configuration information indicates that the client device folder was intentionally unbound. In such embodiments, determination 510 is negative, and invariant checker 170 can determine (520) whether the configuration information indicates that a past binding was terminated. When invariant checker 170 determines (520) that the user tried to unbind client device folder from the content management system, invariant checker can conclude 530 that the user intends the client device folder to be outside the sync folder.

Alternatively, it can be determined (520) that the invariant checker 170 does not know what the user's intent is and the invariant checker 170 can handle an unknown intent the same manner as if the user's intention is to have the client device folders be at their default (original) location.

Accordingly, the invariant checker 170 can determine (522) whether the operating system currently identifies the location of the client device folder as the second location (in the sync folder). If the operating system currently identifies the location of the client device folder to be within the sync folder, client application 152 can prompt (524) the user to rebind the folder to the content management system. If the operating system currently identifies any other location of the client device folder, client application 152 can prompt (526) the user to confirm and complete unbinding of the client device folder from the content management system.

A primary goal of the invariant checker 170 is to make sure that whatever location the operating system points to for the client device folders that a client device folder is in that location without any data loss. In any questionable circumstance, invariant checker 170 will restore the client device folders, especially OS folders, to their default (first) location and inform the user with a prompt.

While the present technology, as it has been described above, has referred to embodiments wherein any local device folder that is represented in the sync folder association to a particular client device to which the local device folder originated, it is also contemplated that in some embodiments, it can be useful to have two folders that provide the same function on two different devices to have the content items within them be synchronized. For example, two different client devices can have a desktop folder, where any content item that is added to one desktop folder can be synchronized to the other desktop folder. Thus, content management system can merge two distinct desktops into a single unified desktop amongst each device. The unified desktop can be provided across devices with diverse operating systems, (e.g., a WINDOWS device and a MAC OS device).

As used herein, the term "functional" folder refers to a folder on a client device with a function or a name with semantic meaning, where these functional folders can occur on multiple client devices. Examples of functional folders generally tracks the OS folders described above, but can also include other user specified folders. An example of a user specified functional folder might be a receipts folder that a user defines on each client device they own.

Figure 6:
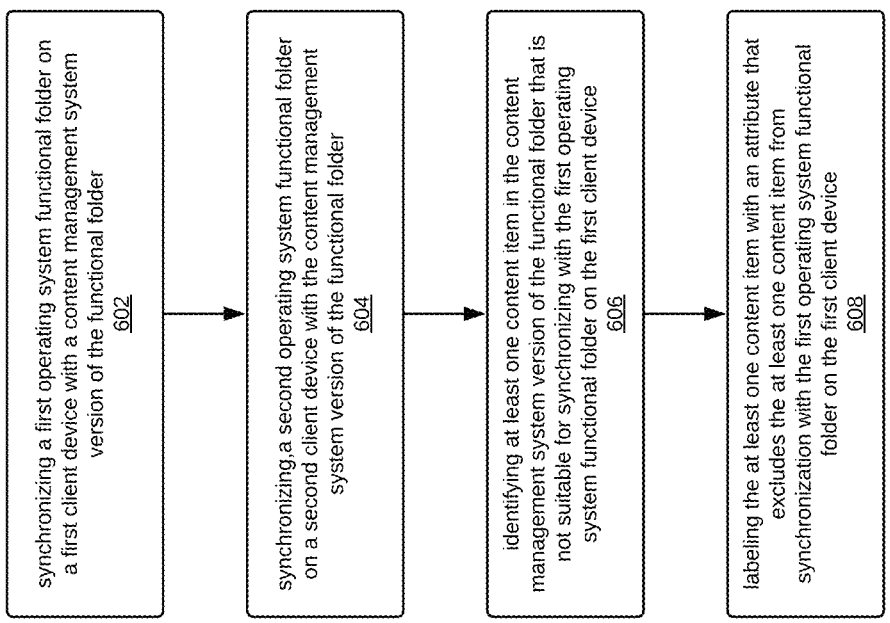
FIG. 6 shows an example method for synchronizing content items in a first operating system functional folder on a first client device with content items in a second operating system functional folder on a second client device in accordance with some aspects of the present technology.

FIG. 6 illustrates a method for providing this unified experience for functional folders. Content management system 110 can synchronize (602) with a first operating system functional folder on a first client device with a content management system copy of the functional folder. Content management system 110 can also synchronize (604) a second functional folder on a second client device with the content management system copy of the functional folder. Since both the first functional folder on the first client device and the second functional folder on the second client device both synchronize to the same version of the functional folder at the content management system, both client devices can maintain substantially the same content items in the functional folder.

However, as two distinct folders are synchronizing with a common folder, when the unified experience is set up it is important to make sure there are no version conflicts. In some embodiments, multiple files may have the same filename and one version or another will need to be renamed to ensure no loss of data.

Another complication in providing a unified experience across multiple client devices is that some content items in some folders are not suitable to be synchronized to another device. For example, if the functional folder is a music folder that includes an index of all the music in the folder for use by a media player, that index may be device specific and would appear corrupt to any other device. In such embodiments content management system 110 can identify (606) at least one content item in the content management system version of the functional folder that is not suitable for synchronizing with the first operating system functional folder on the first client device. Content engine system 110 can label (608) at least one content item with an attribute that excludes the at least one content item from synchronization with the first operating system functional folder on the first client device. However, that content item will still be able to be synchronized with the second operating system functional folder on the second client device.

In some embodiments, some content items can't be synchronized even when only one client device is synchronizing its local device folders with the content management system. In other words, some content items just can't be synchronized. In such embodiments, these content items can still be moved when the local device folder when it is bound to the content management system, but the content item will not be synchronized. The user can receive a notification regarding the synchronization error and the content item will be marked with an icon showing that the content item has not been synchronized.

While the present technology described above has been discussed in the context of redirecting an operating system reference for a location of a particular folder to refer to a single directory under management of content number system client application 152, another way of achieving the same result would be to instruct content management system to synchronize certain selected directories outside of its typical single directory. In such embodiments, content management system client application 152 can request permission from an operating system to have access to content items in a particular directory. Content management system can then watch that directory in its current location while mounting that directory under the user account in the content management system. In this way content system client application 152 can synchronize local device folders without having to move the local device folder into the sync directory managed by client application 152.

Figure 7:
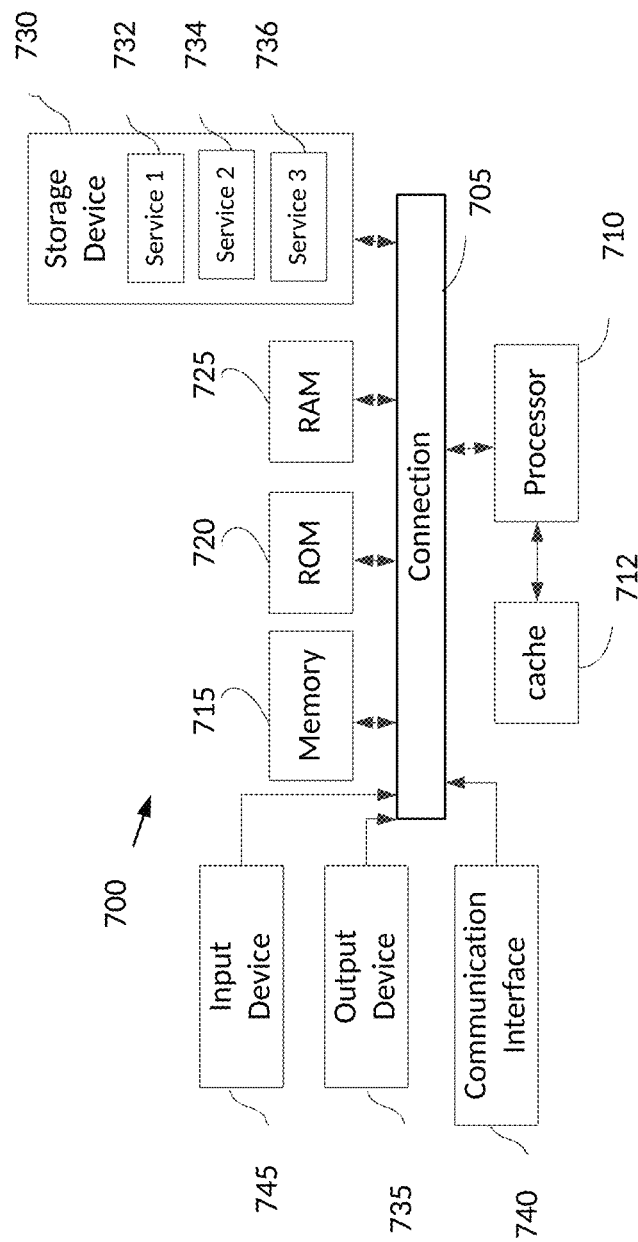
FIG. 7 shows an example of a system for implementing certain aspects of the present technology.

FIG. 7 shows an example of computing system 700, which can be for example any computing device making up client device 150, content management system 110 or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a client application associated with a content management system, a user selection to synchronize an operating system functional folder using the content management system, the operating system functional folder being stored on a client device at a first location that is outside of a synchronized folder of the content management system, the client application associated with a user account on the content management system;
after the user selection, moving the operating system functional folder at the first location of the client device to a second location within the synchronized folder of the content management system; and
creating a pointer in an operating system on the client device to the second location within the synchronized folder of the content management system.

2. The method of claim 1, wherein the operating system functional folder is required by the operating system.

3. The method of claim 1, wherein the creating the pointer involves replacing a reference to the operating system functional folder at the first location with a reference to the operating system functional folder at the second location in the operating system.

4. The method of claim 1, comprising:
associating the operating system functional folder at the second location with special attributes, the special attributes at least identify the operating system functional folder as non-deletable, and identifying the client device and the operating system associated with the first location, the special attributes are effective to define customized synchronization behavior and customized display behavior for the operating system functional folder.

5. The method of claim 4 comprising:
associating at least one content item in the operating system functional folder with special attributes, the special attributes are effective to define customized synchronization behavior and customized display behavior for the at least one content item.

6. The method of claim 1 further comprising:
performing an invariant check comprising comparing a content management system record of a current state of the operating system functional folder with a client application record of a current state of the operating system functional folder and with an operating system current state of the operating system functional folder.

7. The method of claim 6, wherein the invariant check identifies an inconsistency between any of the content management system record of the current state of the operating system functional folder, the client application record of the current state of the operating system functional folder, and the operating system current state of the operating system functional folder that is caused by the operating system pointing to a different folder location for the operating system functional folder than the second location, restore the operating system functional folder to the first location.

8. A non-transitory computer readable medium comprising instructions, the instructions, when executed by a computing system, cause at least one processor to:
associate, by a content management system, a first operating system functional folder having a first content item on a first client device with a content management system version of the first operating system functional folder, wherein the first operating system functional folder is a folder required by a first operating system on the first client device;
associate, by the content management system, a second operating system functional folder having a second content item on a second client device with the content management system version of the second operating system functional folder, wherein the second operating system functional folder is a folder required by a second operating system on the second client device, whereby both the first operating system functional folder and the second operating system functional folder are synchronized with a content management system functional folder; and
move the first operating system functional folder and the second operating system functional folder to the content management system, whereby the first operating system functional folder and the second operating system functional folder both store a copy of the first content item and the second content item.

9. The non-transitory computer readable medium of claim 8, wherein the first operating system and the second operating system are different operating system platforms.

10. The non-transitory computer readable medium of claim 8, further comprising instructions to:
maintain, by the content management system, after the content management system version of the first operating system functional folder has completed synchronizing with the first operating system functional folder and the second operating system functional folder, a first representation of a current synchronization state of the first operating system functional folder, and a second representation of a current synchronization state of the second operating system functional folder, wherein the first representation of the current synchronization state of the first operating system functional folder and the second representation of the current synchronization state of the second operating system functional folder are different.

11. The non-transitory computer readable medium of claim 8, further comprising instructions to:
associate the second operating system functional folder at a second location with special attributes, the special attributes at least identify the second operating system functional folder as non-deletable, and identifying the first client device and the first operating system associated with a first location, the special attributes are effective to define customized synchronization behavior and customized display behavior for the second operating system functional folder.

12. The non-transitory computer readable medium of claim 8, further comprising instructions to:
associate at least one content item in the first operating system functional folder with special attributes, the special attributes are effective to define customized synchronization behavior and customized display behavior for the at least one content item.

13. The non-transitory computer readable medium of claim 12, further comprising instructions to:
identify at a third content item in the content management system version of the first operating system functional folder that is not suitable for synchronizing with the first operating system functional folder on the first client device; and
label the at least one content item with the special attributes that excludes the at least one content item from synchronization with the first operating system functional folder on the first client device, but permits synchronization with the second operating system functional folder on the second client device.

14. A system comprising:

a non-transitory computer readable medium comprising instructions; and at least one processor that is effective to execute the instructions to:

receive, by a client application associated with a content management system, a user selection to synchronize an operating system functional folder using the content management system, the operating system functional folder being stored on a client device at a first location that is outside of a synchronized folder of the content management system, the client application associated with a user account on the content management system;

after the user selection, move the operating system functional folder at the first location of the client device to a second location within the synchronized folder of the content management system; and create a pointer in an operating system on the client device to the second location within the synchronized folder of the content management system.

15. The system of claim 14, wherein the operating system functional folder is required by the operating system.

16. The system of claim 14, wherein the creating the pointer involves replacing a reference to the operating system functional folder at the first location with a reference to the operating system functional folder at the second location in the operating system.

17. The system of claim 14, comprising:

associate the operating system functional folder at the second location with special attributes, the special attributes at least identify the operating system functional folder as non-deletable, and identifying the client device and the operating system associated with the first location, the special attributes are effective to define customized synchronization behavior and customized display behavior for the operating system functional folder.

18. The system of claim 17, comprising:

associate at least one content item in the operating system functional folder with special attributes, the special attributes are effective to define customized synchronization behavior and customized display behavior for the at least one content item.

19. The system of claim 14, further comprising:

perform an invariant check comprising comparing a content management system record of a current state of the operating system functional folder with a client application record of a current state of the operating system functional folder and with an operating system current state of the operating system functional folder.

20. The system of claim 19, wherein the invariant check identifies an inconsistency between any of the content management system record of the current state of the operating system functional folder, the client application record of the current state of the operating system functional folder, and the operating system current state of the operating system functional folder that is caused by the operating system pointing to a different folder location for the operating system functional folder than the second location, restore the operating system functional folder to the first location.

* * * * *